US00H002189H

(19) United States
(12) Statutory Invention Registration
Rao et al.
(10) Reg. No.: US H2189 H
(43) Published: May 1, 2007

(54) SQL ENHANCEMENTS TO SUPPORT TEXT QUERIES ON SPEECH RECOGNITION RESULTS OF AUDIO DATA

(75) Inventors: Vishal Rao, Woburn, MA (US); Rajiv Chopra, Woburn, MA (US)

(73) Assignee: Oracle International Corporation, Redwood Shores, CA (US)

(21) Appl. No.: 10/361,571

(22) Filed: Feb. 11, 2003

Related U.S. Application Data

(60) Provisional application No. 60/419,520, filed on Oct. 21, 2002.

(51) Int. Cl.
*G01L 11/00* (2006.01)

(52) U.S. Cl. ..... 704/270.1

(58) Field of Classification Search ..... None
See application file for complete search history.

(56) References Cited

U.S. PATENT DOCUMENTS 6,233,544 B1 * 5/2001 Alshawi ..... 704/2
6,601,073 B1 * 7/2003 Robare ..... 340/995.1

* cited by examiner

*Primary Examiner*—Dan Pihulic
(74) *Attorney, Agent, or Firm*—Swidler Berlin Shereff Friedman, LLP

(57) ABSTRACT

A system, method, computer program product, and application program interface for indexing data relating to results of speech recognition in a database management system provides the capability to perform simple and efficient searches on audio speech data with reduced development effort. An application program interface for indexing data relating to results of speech recognition in a database management system comprises an indextype operable to support text queries on speech recognition results, an interface operable to provide interaction with an index of the indextype, and a format adapter interface a format adapter that the index creation activity will invoke to extract relevant information from a proprietary speech recognition format.

27 Claims, 9 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

Fig. 4

| 112<br>DATA TABLE | | |
|---|---|---|
| 402<br>ID(NUMBER) | 404<br>AUDIO(ORDSYS.ORDAUDIO) | 406<br>RESULT(CLOB) |
| | | |
| | | |
| | | |
| | | |
| | | |

Fig. 5

```
SQL>
DECLARE
    obj             ordsys.ORDAudio;
    result_src      CLOB;
    result_dst      CLOB;
BEGIN
    -- Select the result to be processed.
    SELECT t.audio
    INTO obj
    FROM sample_data_table t
    WHERE t.id = 1;
    -- Invoke speech recognition services.
    result_src := obj.Analyze;
    -- Select destination of result
    SELECT t.result
    INTO result_dst
    FROM sample_data_table t
    WHERE t.id = 1
    FOR UPDATE;
    -- Make sure the destination is empty.
    dbms_lob.trim(result_dst, 0);
    -- Copy the result into the destination.
    dbms_lob.copy(result_dst, result_src, dbms_lob.LOBMAXSIZE);
    COMMIT;
EXCEPTION
    WHEN ordsys.SpeechMining.e_AUDIO_RECOGNITION_FAILED THEN
        dbms_output.put_line('Error occurred in audio recognition!);
    WHEN OTHERS THEN
        dbms_output.put_line('Exception caught!');
END;
/
```

500

Fig. 6

```
SQL> CREATE INDEX aud_idx ON sample_data_table(result)
         INDEXTYPE IS ordsys.ORDSpeechIndex;
```

600

Fig. 7

```
SQL> CREATE INDEX aud_idx ON sample_data_table(result)
         INDEXTYPE IS ordsys.ORDSpeechIndex
         PARAMETERS('preferences_string');
```

700

Fig. 8

```
SQL> SELECT id, ordsys.SpeechScore(1)
     FROM sample_data_table
     WHERE ordsys.SpeechContains(result,
                                 'some text query',
                                 1)> 0;
```

800

Fig. 9

```
SQL>
DECLARE
    ct_pairs  ordsys.ORDConfidenceTimestampTable;
    media_id  NUMBER;
    conf      NUMBER;
    ts        NUMBER;

    CURSOR c1 IS
    SELECT t.id, ordsys.SpeechConfidenceTimestamp(1)
    FROM sample_data_table t
    WHERE ordsys.SpeechContains(t.result,
                                'some text query',
                                1) > 0;
BEGIN
    OPEN c1;
    -- Outer loop iterates over matched rows.
    LOOP
    FETCH c1 INTO media_id, ct_pairs;
    EXIT WHEN c1%NOTFOUND;
        -- Inner loop iterates over confidence/timestamp pairs
        -- within a matched row.
        FOR cntr IN 1..ct_pairs.COUNT LOOP
            conf := ct_pairs(cntr).confidence;
            ts   := ct_pairs(cntr).timestamp;
         -- display and/or manipulate confidence/timestamp values
            -- ...
        END LOOP;
    END LOOP;
    CLOSE c1;
END;
/
```

900

Fig. 10

```
parse_and_insert(p_data                IN CLOB,
                 p_table_name          IN VARCHAR2,
                 p_internal_doc_id     IN NUMBER)


p_data:
A CLOB containing the results of audio processing in a
vendor specific, optionally encrypted, proprietary
format.

p_table_name:
Schema qualified table name that has the following
columns in the following order:

             internal_doc_id          NUMBER
             seq                      NUMBER
             text                     VARCHAR2
             confidence               NUMBER
             timestamp                NUMBER
             char_offset              NUMBER

p_internal_doc_id:
Key to original row in the indexed table. This must be
inserted into the internal_doc_id column of the
specified table for each row that is inserted.
```

1000

Fig. 11

```
parse_and_insert(p_data                IN    CLOB,
                 p_table_name          IN    VARCHAR2,
                 p_internal_doc_id     IN    NUMBER)
VARIABLES
    sequence_number   INTEGER := 1;
    character_offset  INTEGER := 1;
BEGIN
    IF (p_data == NULL) THEN RETURN;
    IF (p_data.length() == 0) THEN RETURN;
    WHILE (we haven't reached the end of p_data)
    BEGIN
        Extract the next first choice
            <text, confidence, timestamp> tuple;
        INSERT INTO p_table_name
            VALUES(p_internal_doc_id,
                   sequence_number,
                   text,
                   confidence,
                   timestamp,
                   character_offset);
        // Update variables for the next iteration;
        sequence_number := sequence_number + 1;
        // +1 is for a space char
        character_offset := character_offset + text.length() + 1;
    END;
END;
```

1100

SQL ENHANCEMENTS TO SUPPORT TEXT QUERIES ON SPEECH RECOGNITION RESULTS OF AUDIO DATA

CROSS-REFERENCE TO RELATED APPLICATIONS

The benefit under 35 U.S.C. § 119(e) of provisional application Ser. No. 60/419,520, filed October 21, 2002, is hereby claimed.

FIELD OF THE INVENTION

The present invention relates to a system, method, computer program product, and application program interface for indexing data relating to results of speech recognition in a database management system.

BACKGROUND OF THE INVENTION

Speech recognition technology provides the capability to design computer systems that can recognize spoken words. Speech recognition systems accept audio speech data, which are digitized audio speech signals, and output textual information. A number of speech recognition systems are available on the market. The most powerful can recognize thousands of words. However, they generally require an extended training session during which the computer system becomes accustomed to a particular voice and accent. Such systems are said to be speaker dependent. More recently speech recognition systems have been developed that can recognize speech without being trained using a particular voice and accent. Such systems may recognize the speech of most or any speakers, and are said to be speaker independent.

Audio speech data may be treated like any other data and stored and organized in a database. In the case of textual or numeric data, searches may be readily performed on the data by a database management system for the database. However, unlike textual or numeric data, there is no simple and efficient way to search audio speech data. Prior systems required developers who wished to search audio speech data had to develop complex software procedures in order to perform the searching. For example, to perform a typical search, a user will want to know which audio or video assets satisfy given text query search criteria, the time offsets within each matched media asset where matches occurred, and the user may want to know the speech recognition confidence of each match. Conventionally, this required development of software to perform several iterations of extracting the relevant text, time offset, and confidence data from the speech recognition results, build appropriate B-tree indices on this extracted data, and associate time offsets and confidence values. with their corresponding text data. In addition, procedures would have to be developed that would use the index and search through the text data for matched rows, and then search through the matched rows for time offsets into the media asset where matches occurred.

What is needed is a technique by which simple and efficient searches may be performed on audio speech data and which provides reduced development effort.

SUMMARY OF THE INVENTION

The present invention provides the capability to perform simple and efficient searches on audio speech data with reduced development effort. According to one embodiment of the present invention, an application program interface for indexing data relating to results of speech recognition in a database management system comprises an indextype operable to support text queries on speech recognition results, an interface operable to provide interaction with an index of the indextype, and a format adapter interface operable to invoke a format adapter for converting speech recognition results having a first format to a second format.

The format adapter may be operable to parse the speech recognition results in the first format, extract from the speech recognition results text data representing the recognized speech, information relating to a confidence in each speech recognition result, and timestamp information indicating a location of each portion of a speech recognition result, and generate speech recognition results in the second format using the extracted text data representing the recognized speech, information relating to a confidence in each speech recognition result, and timestamp information indicating a location of each portion of a speech recognition result.

The indextype may comprise the text data representing the recognized speech, the information relating to a confidence in each speech recognition result, and the timestamp information indicating a location of each portion of a speech recognition result. The interface may be operable to provide interaction comprising performing a query of the text data representing the recognized speech. The query of the text data representing the recognized speech relates to the confidence information and/or the timestamp information. The results of the query may indicate time offsets within each matched media asset where matches occurred and speech recognition confidence of each match occurrence within a matched media asset.

BRIEF DESCRIPTION OF THE DRAWINGS

The details of the present invention, both as to its structure and operation, can best be understood by referring to the accompanying drawings, in which like reference numbers and designations refer to like elements.

FIG. 4 is an exemplary format of data table that may be used in the present invention.

FIG. 5 is an exemplary code sample of how an application would invoke speech recognition on a particular row and populate the result column.

FIG. 6 is an example of an SQL command to build an index on the result column.

FIG. 7 is an example of an SQL command to create and pass preferences as arguments to index creation.

FIG. 8 is an example of a simple query on the data table, which makes use of the index.

FIG. 9 is an example of a query that retrieves confidence and timestamps for each occurrence within a matched audio asset row.

FIG. 10 is an example of an interface to a format adapter shown in FIG. 1, which is a proprietary format understanding procedure that extracts the information required for creating an index of the required indextype from a proprietary audio processing result format of a speech recognition engine.

FIG. 11 is an algorithmic description of an exemplary implementation of the proprietary format understanding procedure.

DETAILED DESCRIPTION OF THE INVENTION

An exemplary dataflow diagram of speech indexing processing performed in the present invention is shown in FIG.

Figure 1:
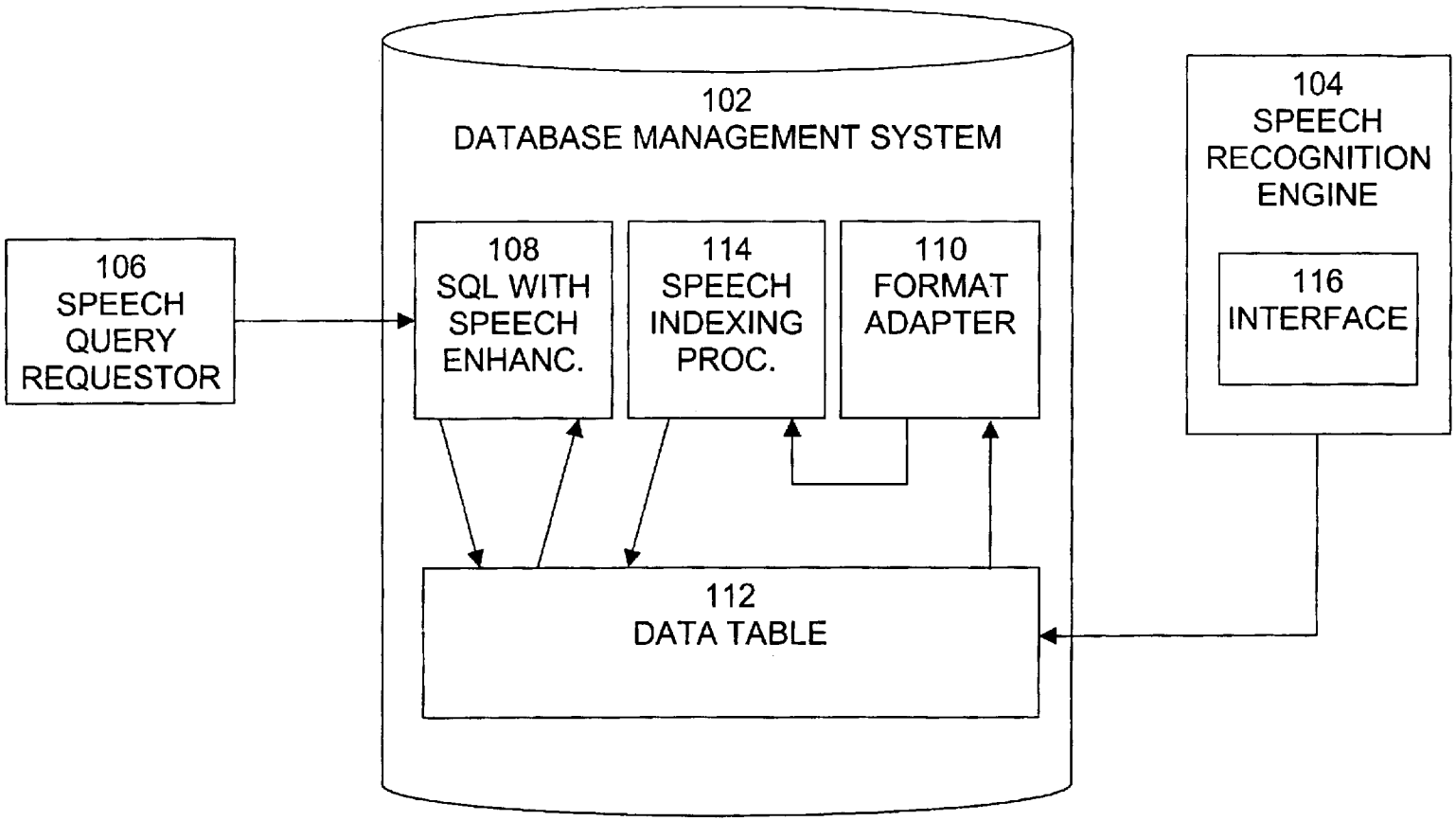
FIG. 1 is an exemplary dataflow diagram of speech indexing processing performed in the present invention.

1. Included in FIG. 1 are database management system (DBMS) 102, speech recognition engine 104, and speech query requestor 106. Speech query requester 106 may be any database client, tool, or application that wants to issue text queries on audio speech data.

Database management system (DBMS) 102 provides the capability to store, organize, modify, and extract information from one or more databases included in DBMS 102. From a technical standpoint, DBMSs can differ widely. The terms relational, network, flat, and hierarchical all refer to the way a DBMS organizes information internally. The internal organization can affect how quickly and flexibly you can extract information.

Each database included in DBMS 102 includes a collection of information organized in such a way that computer software can select and retrieve desired pieces of data. Traditional databases are organized by fields, records, and files. A field is a single piece of information; a record is one complete set of fields; and a file is a collection of records. An alternative concept in database design is known as Hypertext. In a Hypertext database, any object, whether it be a piece of text, a picture, or a film, can be linked to any other object. Hypertext databases are particularly useful for organizing large amounts of disparate information, but they are not designed for numerical analysis.

Typically, a database includes not only data, but also low-level database management functions, which perform accesses to the database and store or retrieve data from the database. Such functions are often termed queries and are performed by using a database query language, such as Structured Query Language (SQL). SQL is a standardized query language for requesting information from a database. Historically, SQL has been a popular query language for database management systems running on minicomputers and mainframes. Increasingly, however, SQL is being supported by personal computer database systems because it supports distributed databases (databases that are spread out over several computer systems). This enables several users on a local-area network to access the same database simultaneously.

Most full-scale database systems are relational database systems. Small database systems, however, use other designs that provide less flexibility in posing queries. Relational databases are powerful because they require few assumptions about how data is related or how it will be extracted from the database. As a result, the same database can be viewed in many different ways. An important feature of relational systems is that a single database can be spread across several tables. This differs from flat-file databases, in which each database is self-contained in a single table.

DBMS 102 may also include one or more database applications, which are software that implements a particular set of functions that utilize one or more databases. Examples of database applications include:

computerized library systems automated teller machines flight reservation systems computerized parts inventory systems Typically, a database application, includes data entry functions and data reporting functions. Data entry functions provide the capability to enter data into a database. Data entry may be performed manually, by data entry personnel, automatically, by data entry processing software that receives data from connected sources of data, or by a combination of manual and automated data entry techniques. Data reporting functions provide the capability to select and retrieve data from a database and to process and format that data for other uses. Typically, retrieved data is used to display information to a user, but retrieved data may also be used for other functions, such as account settlement, automated ordering, numerical machine control, etc.

DBMS 102 includes speech enhancements 108, format adapter 110, data table 112 and speech indexing processing 114. Speech enhancements 108 are extensions to the standard query language of DBMS 102. For example, where DBMS 102 uses SQL, speech enhancements include extensions to the command set of SQL, an indextype, and its associated operators and types to empower applications with sophisticated text querying capabilities on audio data.

Speech recognition engine 104 provides speech recognition processing functionality to DBMS 102. Speech recognition engine 104 is typically configured as a server communicatively connected to DBMS 102. Preferably, speech recognition engine 104 provides large vocabulary continuous speech recognition (LVCSR) services to DBMS 102. Essentially, speech recognition engine 104 receives data that represents digitized speech, processes the data to recognize the speech, and outputs text data that represents the speech, which is the speech recognition result. The speech recognition results are placed in the CLOB (Character Large Object) result column in the data table 112 the procedure that invoked the speech recognition processing. This procedure places the result in a CLOB column in data table 112 next to the audio data. When a Create Index command is issued on this CLOB column, Speech Indexing processing 114 is invoked, which in turn invokes format adapter 110. Typically, the speech recognition result is arranged in a proprietary format. Format adapter 110 adapts the format of the speech recognition result generated by speech recognition engine 104 to the format used for speech indexing. Format adapter 110 parses the speech recognition result and extracts the required information. In particular, format adapter 110 extracts text, confidence, and timestamp tuples from each speech recognition result.

Speech indexing processing 114 receives the text, confidence, and timestamp tuples extracted from the proprietary format of each speech recognition result by format adapter 110, stores the extracted information in its own internal data structures and creates an index of the required indextype based on the extracted data. When an index of the required indextype is created or updated, speech indexing processing 114 is invoked for each new or updated row in data table 112. The row data, which are extracted from the speech recognition results, along with a table name and key to the original row in the indexed table, are provided as parameters. The routine must process the speech recognition result to extract <text, timestamp, confidence> and insert this data, along with some additional computed data (character offset and sequence number), and the key supplied as a parameter to the procedure into a that is part of an index internal data structure. Speech indexing processing 114 then inserts the extracted tuples of information into index data structures that are stored independently from the table upon which the index is built.

An example of an interface 1100 to format adapter 110 and speech indexing processing 114 is shown in FIG. 10 An example of an implementation of format adapter 110 is shown in FIG. 11.

Figure 2:
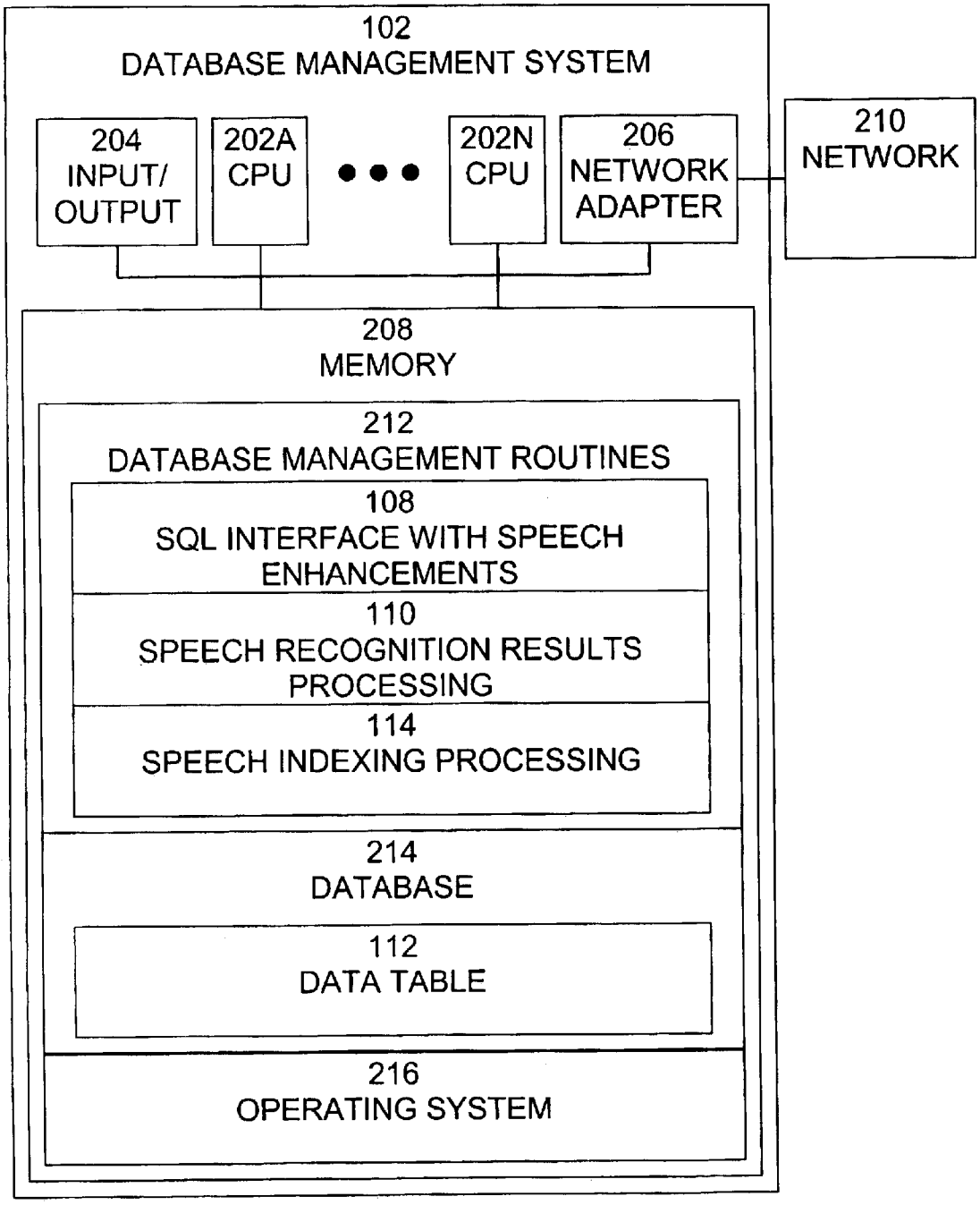
FIG. 2 is a block diagram of an exemplary implementation of a database management system, in which the present invention may be implemented.

A block diagram of an exemplary implementation of a DBMS 102, in which the present invention may be implemented, is shown in FIG. 2. DBMS 102 is typically a programmed general-purpose computer system, such as a personal computer, workstation, server system, and minicomputer or mainframe computer. DBMS 102 includes one or more processors (CPUs) 202A–202N, input/output circuitry 204, network adapter 206, and memory 208. CPUs 202A–202N execute program instructions in order to carry out the functions of the present invention. Typically, CPUs 202A–202N are one or more microprocessors, such as an INTEL PENTIUM® processor. FIG. 2 illustrates an embodiment in which DBMS 102 is implemented as a single multi-processor computer system, in which multiple processors 202A–202N share system resources, such as memory 208, input/output circuitry 204, and network adapter 206. However, the present invention also contemplates embodiments in which DBMS 102 is implemented as a plurality of networked computer systems, which may be single-processor computer systems, multi-processor computer systems, or a mix thereof.

Input/output circuitry 204 provides the capability to input data to, or output data from, DBMS 102. For example, input/output circuitry may include input devices, such as keyboards, mice, touchpads, trackballs, scanners, etc., output devices, such as video adapters, monitors, printers, etc., and input/output devices, such as, modems, etc. Network adapter 206 interfaces DBMS 102 with network 210. Network 210 may include one or more standard local area networks (LAN) or wide area networks (WAN), such as Ethernet, Token Ring, the Internet, or a private or proprietary LAN/WAN.

Memory 208 stores program instructions that are executed by, and data that are used and processed by, CPU 202 to perform the functions of DBMS 102. Memory 208 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

In the example shown in FIG. 2, memory 208 includes database management routines 212, database 214, and operating system 216. Database management routines 212 include software routines that provide the database management functionality of DBMS 102. Database management routines 212 include SQL interface with speech enhancements 108, format adapter 110, and speech indexing processing 114. SQL interface 108 accepts database queries using the SQL database query language, converts the queries to a series of database access commands, calls database processing routines to perform the series of database access commands, and returns the results of the query to the source of the query. For example, in an embodiment in which DBMS 102 is a proprietary DBMS, such as the ORACLE® DBMS, SQL interface 108 may support one or more particular versions of SQL or extensions to SQL, such as the ORACLE® PL/SQL extension to SQL. Speech enhancements are extension to the standard query language of DBMS 102. For example, where DBMS 102 uses SQL, speech enhancements include extensions to the command set of SQL, an indextype, and its associated operators and types to empower applications with sophisticated text querying capabilities on audio data.

Format adapter 110 processes the speech recognition result from speech recognition engine 104. Typically, the speech recognition result is arranged in a proprietary format. Format adapter 110 adapts the format of the speech recognition result generated by speech recognition engine 104 to the format used for speech indexing. Format adapter 110 parses the speech recognition result and extracts the required information. In particular, format adapter 110 extracts text, confidence, and timestamp tuples from each speech recognition result.

Speech indexing processing 114 receives. the text, confidence, and timestamp tuples extracted from the proprietary format of each speech recognition result by format adapter 110, stores the extracted information in its own internal data structures and creates an index of the required indextype based on the extracted data. When an index of the required indextype is created or updated, speech indexing processing 114 is invoked for each new or updated row in data table 112. The row data, which are extracted from the speech recognition results, along with a table name and key to the original row in the indexed table, are provided as parameters. The routine must process the speech recognition result to extract <text, timestamp, confidence> and insert this data, along with some additional computed data (character offset and sequence number), and the key supplied as a parameter to the procedure into a that is part of an index internal data structure. Speech indexing processing 114 then inserts the extracted tuples of information into index data structures that are stored independently from the table upon which the index is built. Database 214 includes a collection of information organized in such a way that computer software can select, store, and retrieve desired pieces of data. Typically, database 214 includes a plurality of data tables, such as data table 112. Data table 112 is arranged to store audio speech data that has been or is to be processed by speech recognition engine 104, shown in FIG. 1, speech recognition processing results output by speech recognition engine 104. Preferably, indexing information is kept in internal data structures, not in the same data table that stores the media data and speech recognition results. Typically, a user of the system would store media assets in data table 112.

In addition, as shown in FIG. 2, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

Figure 3:
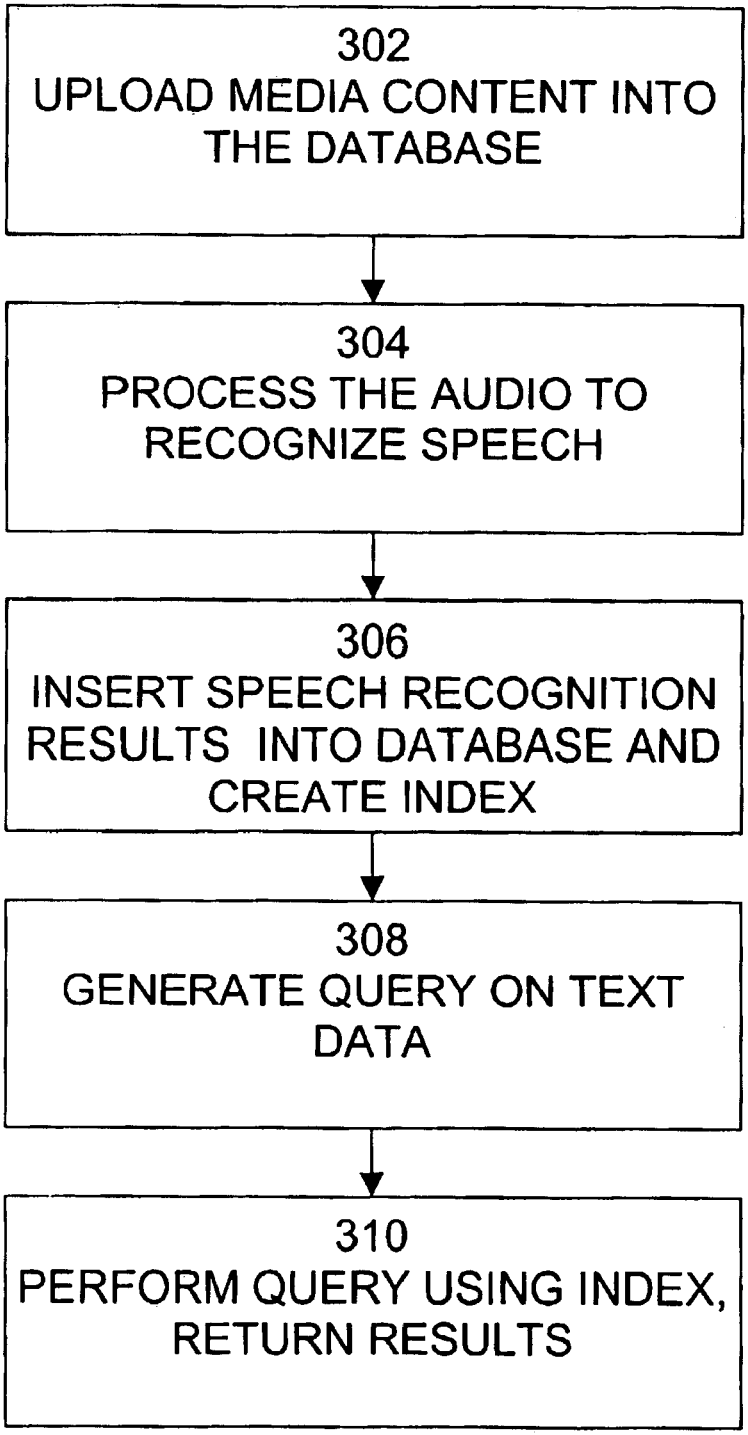
FIG. 3 is an exemplary flow diagram of a process of operation of the present invention.

An exemplary flow diagram of a typical process 300 of operation of a database management system incorporating the present invention is shown in FIG. 3. It is best viewed in conjunction with FIG. 1. Process 300 begins with step 302, in which media content is uploaded into a database table in DBMS 102, such as data table. In particular, media content includes audio speech data, which are digitized audio speech signals. In step 304, a speech recognition processing requestor 106, such as an application, that wants to process audio data with speech recognition engine 104 invokes the appropriate speech recognition. This causes the speech recognition engine 104, which is waiting for speech processing requests to receive a request for speech recognition. The received requests are processed by interface 116 of speech recognition engine 104. Speech recognition engine 104 processes the speech data in this request in order to recognize the speech and generate text data representing the recognized speech.

In step 308, format adapter 110 adapts the format of the speech recognition result generated by speech recognition engine 104 to the format used for speech indexing. Format adapter 110 parses the speech recognition result and extracts the required information. In particular, format adapter 110 extracts text, confidence, and timestamp tuples from each speech recognition result. Then, speech indexing processing 114 receives the text, confidence, and timestamp tuples extracted from the proprietary format of each speech recognition result by format adapter 110, inserts the extracted data in to data table 112 and creates an index of the required indextype based on the inserted data. In one embodiment shown in FIG. 1, the extracted text, confidence, and timestamp tuples from format adapter 110 are passed directly to speech indexing processing 114 for index creation. In other embodiments, the extracted text, confidence, and timestamp tuples from format adapter 110 may be stored before being passed o speech indexing processing 114 for index creation. When an index of the required indextype is created or updated, speech indexing processing 114 is invoked for each new or updated row in data table 112. The row data, which are extracted from the speech recognition results, along with a table name and are provided as parameters. This routine must process the data to extract <text, timestamp, confidence> tuples and insert them into data table 112. Speech indexing processing 114 then inserts the extracted tuples of information into index data structures associated.

In step 308, speech query requestor 206 generates a query on the text data included in data table 112 and transmits the query to DBMS 102. The generated query utilizes speech enhancements 108 to the query language used by DBMS 102. In step 310, DBMS 102 performs the query by accessing data table 112 and, using the index, retrieves the specified information, and returning the results of the query to speech query requester 106.

Following is an exemplary description of a sample usage scenario that will demonstrate the power and ease of use of the speech indexing functionality provided by the present invention.

Imagine a scenario in which a customer wants to do the following:

1. Upload media content including audio into DBMS 102.
2. Process the audio by sending data to a previously started speech recognition engine 104 and store the results in DBMS 102.
3. Create an index on the speech recognition results that will allow for sophisticated text querying capabilities.
4. Query the data to retrieve matched rows along with time offset and speech recognition confidence pairs for each occurrence within a matched row.

The customer stores media content including audio in data table 112 in DBMS 102. An exemplary format of data table 112 is shown in FIG. 4. Data table 112 includes id column 402, audio data column 404, and result column 406. For each row of data in data table 112, id column 402 includes a unique identifier if the data in the row, audio data column 404 includes the actual audio data, and result column 406 includes the speech recognition results. An example 500 of how an application would invoke speech recognition on a particular row and populate the result column 406 is shown in FIG. 5.

After the application has processed each audio asset in data table 112 and populated the result column 406, it is now ready to build an index on the result column, for example, using an SQL command 600, such as that shown in FIG. 6. For enhanced text queries that need to take into account customized preferences, such as lexer and wordlist preferences, the application can create preferences using the and pass those preferences as arguments to index creation, for example, using an SQL command 700, such as that shown in FIG. 7.

An example 800 of a simple query on the data table 112 is shown in FIG. 8. An example 900 of a more sophisticated query that that retrieves confidence and timestamps for each occurrence within a matched audio asset row is shown in FIG. 9. In this example, the SpeechContains operator matches those rows that satisfy the input query while the ancillary operator SpeechConfidenceTimestamp returns the corresponding collection of confidence/timestamp pairs for each returned row.

Format adapter 110 must be provided to adapt the format of the speech recognition result generated by speech recognition engine 104 to the format used for speech indexing. The formatting procedure must extract the information required for creating an index of the required indextype from the proprietary audio processing result format of speech recognition engine 104. In one embodiment, when an index of the required indextype is created or updated, format adapter 110 is invoked for each new or updated row in the indexed table. The row data, which are processing results of SpcechMining, along with a table name and key to the original row in the indexed table, are provided as parameters. This routine must process the data to extract <text, timestamp, confidence> tuples. An example of the interface 100 to format adapter 110 is shown in FIG. 10. An example of the processing 1100 performed by format adapter 110 is shown in FIG. 11.

APPENDIX A

OPERATOR: SpeechContains

Signature

```
SpeechContains(indexed_column CLOB,
        query_string VARCHAR2,
        [reference_label NUMBER])
    RETURN NUMBER;
```

Description

Use the SpeechContains operator in the WHERE clause of a SELECT statement to specify the query expression for a SpeechIndexing query. SpeechContains returns a relevance score for every row selected. You obtain this score with the SpeechScore operator. Additionally, SpeechConfidenceTimestamp returns tuples of speech recognition confidences and time offsets for the matches in the selected row.

Parameters indexed_column: Specify the CLOB column to be searched on. This column must have an ordsys.ORDSpeechIndex index associated with it.
query_string: Specify the query that defines your search in indexed_column. Oracle Text query operators can be used in this query string.
reference_label: Optionally specify the label that associates the SpeechScore and SpeechConfidenceTimestamp generated by the SpeechContains operator.

Returns

For each row selected, SpeechContains returns a number between 0 and 100 that indicates how relevant the document row is to the query. The number 0 means that Oracle found no matches in the row.

Example

The following example searches for all documents in the SpeechMining_result column that contain the word 'oracle'. The score for each row is selected with the SpeechScore operator using a label of 1:

```
SELECT ordsys.SpeechScore(1), title
FROM audionews
```

APPENDIX A-continued

WHERE ordsys.SpeechContains(SpeechMining_result, 'oracle', 1) > 0;

OPERATOR: SpeechScore

Signature

SpeechScore(reference_label IN NUMBER) RETURN NUMBER;

Description

Use the SpeechScore operator in a SELECT statement to return the score values produced by SpeechContains in an SpeechIndexing query.

Parameters reference_label: An integer that refers to the corresponding invocation of SpeechContains. If there are multiple invocations of SpeechContains in the same query, this parameter is used to maintain the reference.

Notes

The SpeechScore operator can be used in a SELECT, ORDER BY, or GROUP BY clause.

Returns

This operator returns a NUMBER.

Example

See the example for SpeechContains

OPERATOR: SpeechConfidenceTimestamp

Signature

SpeechConfidenceTimestamp(reference_label IN NUMBER)
RETURN ordsys.ORDConfidenceTimestampTable;

Description

Use the SpeechCoinfidenceTimestamp operator in a SELECT statement to return a collection of confidence and timestamp pairs produced by SpeechContains in an SpeechIndexing query.

Parameters reference_label: An integer that refers to the corresponding invocation of SpeechContains. If there are multiple invocations of SpeechContains in the same query, this parameter is used to maintain the reference.

Notes

The SpeechConfidenceTimestamp operator can be used in a SELECT clause.

Returns

This operator returns a table of type ordsys.ORDConfidenceTimestampTable (defined below).

INDEXTYPE: ORDSpeechIndex

Description

This indextype allows a user to create an audio index on a CLOB column that contains the results of SpeechMining.

Parameters parameter_string: Can be used to pass in Oracle Text preferences to the underlying Oracle Text index. Note that datastore preferences are disallowed.

The types below are used to retrieve speech recognition confidence and timestamp values from the query into PL/SQL variables.

OBJECT ORDConfidenceTimestampTuple

CREATE TYPE ORDConfidenceTimestampTuple
AS OBJECT (confidence NUMBER, timestamp NUMBER);

OBJECT ORDConfidenceTimestampTable

CREATE TYPE ORDConfidenceTimestampTable
AS TABLE OF ORDConfidenceTimestampTuple;

What is claimed is:

1. A method for indexing data relating to results of speech recognition in a database management system, comprising the steps of:

receiving speech recognition results at the database management system, the speech recognition results having a first format;

converting the first format of the speech recognition results to a second format; and generating an index of the speech recognition results in the database management system.

2. The method of claim 1, wherein the converting step comprises the steps of:

parsing the speech recognition results in the first format;

extracting from the speech recognition results text data representing the recognized speech, information relating to a confidence in each speech recognition result, and timestamp information indicating a location of each portion of a speech recognition result; and generate speech recognition results in the second format using the extracted text data representing the recognized speech, information relating to a confidence in each speech recognition result, and timestamp information indicating a location of each portion of a speech recognition result.

3. The method of claim 2, wherein the second format is a standardized format.

4. The method of claim 3, wherein the first format is a proprietary format.

5. The method of claim 2, wherein the generating step comprises the steps of:

generating an index using the extracted speech recognition results, including the text data representing the recognized speech, the information relating to a confidence in each speech recognition result, and the timestamp information indicating a location of each portion of a speech recognition result in the database management system; and storing the extracted information.

6. The method of claim 5, wherein the second format is a standardized format.

7. The method of claim 6, wherein the first format is a proprietary format.

8. A system for indexing data relating to results of speech recognition in a database management system comprising:

a processor operable to execute computer program instructions;

a memory operable to store computer program instructions executable by the processor; and computer program instructions stored in the memory and executable to perform the steps of:

receiving speech recognition results at the database management system, the speech recognition results having a first format;

converting the first format of the speech recognition results to a second format; and generating an index of the speech recognition results in the database management system.

9. The system of claim 8, wherein the converting step comprises the steps of:

parsing the speech recognition results in the first format;

extracting from the speech recognition results text data representing the recognized speech, information relating to a confidence in each speech recognition result, and timestamp information indicating a location of each portion of a speech recognition result; and generate speech recognition results in the second format using the extracted text data representing the recognized speech, information relating to a confidence in each speech recognition result, and timestamp information indicating a location of each portion of a speech recognition result.

10. The system of claim 9, wherein the second format is a standardized format.

11. The system of claim 10, wherein the first format is a proprietary format.

12. The system of claim 9, wherein the generating step comprises the steps of:

generating an index using the extracted speech recognition results, including the text data representing the recognized speech, the information relating to a confidence in each speech recognition result, and the timestamp information indicating a location of each portion of a speech recognition result in the database management system; and storing the extracted information.

13. The system of claim 12, wherein the second format is a standardized format.

14. The system of claim 13, wherein the first format is a proprietary format.

15. A computer program product for indexing data relating to results of speech recognition in a database management system comprising:

a computer readable medium;

computer program instructions, recorded on the computer readable medium, executable by a processor, for performing the steps of receiving speech recognition results at the database management system, the speech recognition results having a first format;

converting the first format of the speech recognition results to a second format;

generating an index of the speech recognition results in the database management system.

16. The computer program product of claim 15, wherein the converting step comprises the steps of:

parsing the speech recognition results in the first format; extracting from the speech recognition results text data representing the recognized speech, information relating to a confidence in each speech recognition result, and timestamp information indicating a location of each portion of a speech recognition result; and generate speech recognition results in the second format using the extracted text data representing the recognized speech, information relating to a confidence in each speech recognition result, and tirnestamp information indicating a location of each portion of a speech recognition result.

17. The computer program product of claim 16, wherein the second format is a standardized format.

18. The computer program product of claim 17, wherein the first format is a proprietary format.

19. The computer program product of claim 16, wherein the generating step comprises the steps of:

generating an index using the extracted speech recognition results, including the text data representing the recognized speech, the information relating to a confidence in each speech recognition result, and the timestamp information indicating a location of each portion of a speech recognition result in the database management system; and storing the extracted information.

20. The computer program product of claim 19, wherein the second format is a standardized format.

21. The computer program product of claim 20, wherein the first format is a proprietary format.

22. An application program interface for indexing data relating to results of speech recognition in a database management system comprising:

an indextype operable to support text queries on speech recognition results;

an interface operable to provide interaction with an index of the indextype; and a format adapter interface operable to invoke a format adapter for converting speech recognition results having a first format to a second format.

23. The application program interface of claim 22, wherein the format adapter is operable to parse the speech recognition results in the first format, extract from the speech recognition results text data representing the recognized speech, information relating to a confidence in each speech recognition result, and timestamp information indicating a location of each portion of a speech recognition result, and generate speech recognition results in the second format using the extracted text data representing the recognized speech, information relating to a confidence in each speech recognition result, and timestamp information indicating a location of each portion of a speech recognition result.

24. The application program interface of claim 23, wherein the indextype comprises the text data representing the recognized speech, the information relating to a confidence in each speech recognition result, and the timestamp information indicating a location of each portion of a speech recognition result in the database management system.

25. The application program interface of claim 24, wherein the interface is operable to provide interaction comprising performing a query of the text data representing the recognized speech.

26. The application program interface of claim 25, wherein the query of the text data representing the recognized speech relates to the confidence information and/or the timestamp information.

27. The application program interface of claim 26, wherein results of the query indicate time offsets within each matched media asset where matches occurred and speech recognition confidence of each match occurrence within a matched media asset.

* * * * *